United States Patent [19]
Freeman et al.

[11] Patent Number: 5,491,807
[45] Date of Patent: Feb. 13, 1996

[54] SYSTEM AND METHOD FOR WORM VOLUME MANAGEMENT OF NEW AND UPDATED DATA FILES USING VARIABLE THRESHOLD BLOCK ADDRESSES

[75] Inventors: Harrison L. Freeman, Kasson; William Jaaskelainen, Oronoco; Richard G. Mustain; Larry D. Shumway, both of Rochester, all of Minn.

[73] Assignee: International Business Machines Corporation, Armonk, N.Y.

[21] Appl. No.: 325,752

[22] Filed: Mar. 20, 1989

[51] Int. Cl.$^6$ .......................... G06F 12/02; G11B 17/22
[52] U.S. Cl. .......................... 395/401; 395/404; 395/439; 395/497.02; 395/600; 360/72.1; 360/72.2; 369/30; 369/32
[58] Field of Search .................... 395/400, 425, 395/401, 404, 439, 497.02, 600; 369/32, 30; 360/72.1, 72.2; 364/200 MS File, 900 MS File

[56] References Cited

U.S. PATENT DOCUMENTS

| | | | |
|---|---|---|---|
| 4,791,623 | 12/1988 | Deiotte | 369/59 |
| 4,807,205 | 2/1989 | Picard | 369/30 |
| 4,827,462 | 5/1989 | Flannagan et al. | 369/32 |
| 4,947,367 | 8/1990 | Chang et al. | 395/500 |
| 4,953,122 | 8/1990 | Williams | 395/400 |
| 4,974,197 | 11/1990 | Blount et al. | 395/250 |
| 5,040,110 | 8/1991 | Miki et al. | 395/600 |

OTHER PUBLICATIONS

Patent Abstracts of Japan, vol. 10, No. 341 (P–517) 18 Nov. 1986 & JP–A–61 142 571 (Ricoh Co Ltd) (abstract only).
Patent Abstracts of Japan, vol. 12, No. 114 (P–688) 12 Apr. 1988 & JP–A–62 243 067 (NEC Corp.) (abstract only).
Computer Design, vol. 28, No. 1, 1 Jan. 1989, Littleton, Massachusetts US pp. 93–96 XP98294, R. P. Olsen et al. "Virtual Optical Disks Solve the On–Line Storage Crunch" *p. 95, left column, line 53— p. 96, right column, line 12*.

Primary Examiner—Glenn Gossage
Attorney, Agent, or Firm—Curtis G. Rose

[57] ABSTRACT

A computer system and method for efficiently managing Write Once Read Mostly (WORM) volumes on mass optical storage devices are disclosed. A configuration menu asks the user to enter a threshold percentage from 1–100%. The threshold percentage is multiplied by the volume size to determine a threshold block address. New files are written sequentially to the WORM volume up to but not exceeding the threshold block address, unless a threshold override indicator is enabled. Space on the WORM volume between the threshold block address and the end of the WORM volume is reserved for updated files. Updated files can be stored anywhere on the WORM volume, including above the threshold block address. Reserving space for updated files on a WORM volume allows more updated files to be stored on the same WORM volume as original files, and reduces the number of optical disks required to be read. The threshold percentage can be modified by the user at any time desired 11 Claims, 5 Drawing Sheets

OPEN VOLUME REQUEST

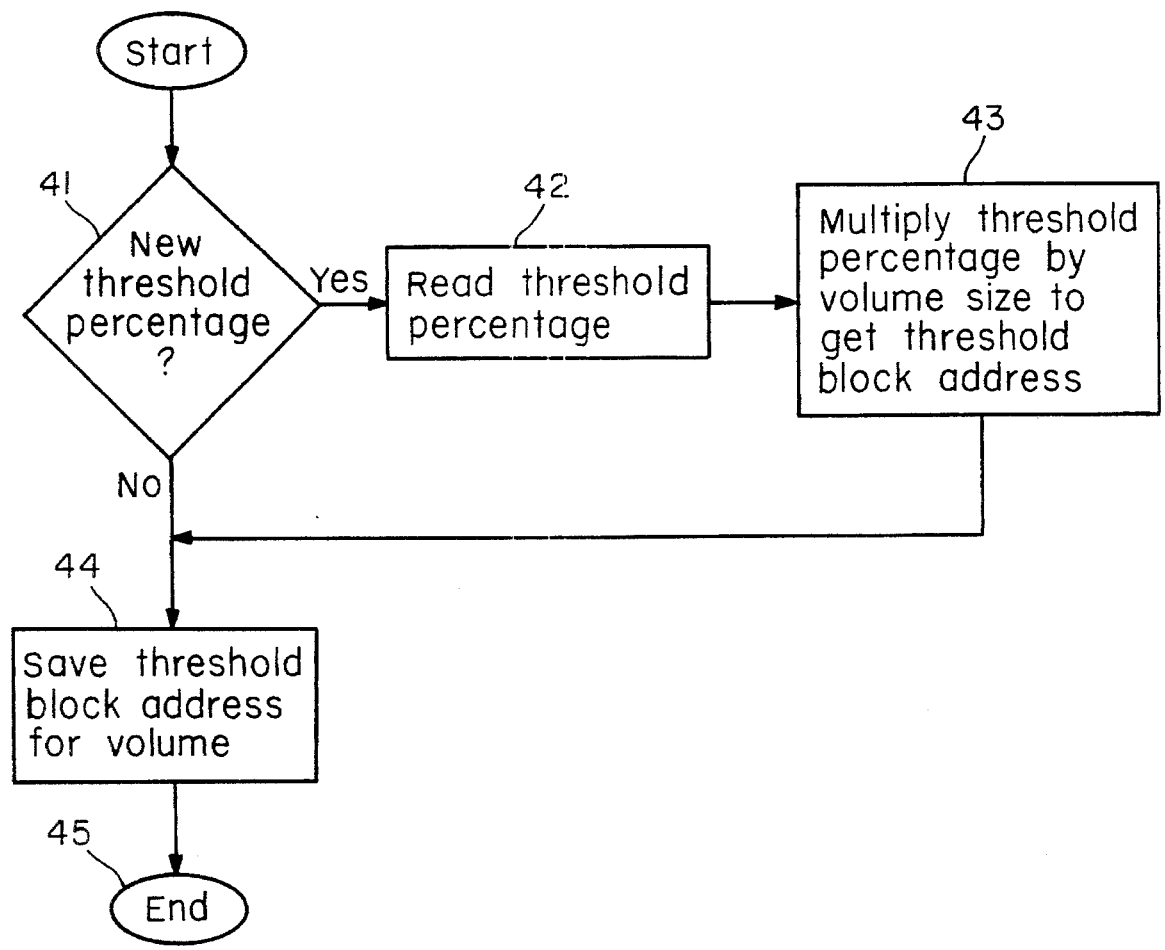
FIG. 4: CONFIGURE VOLUME REQUEST

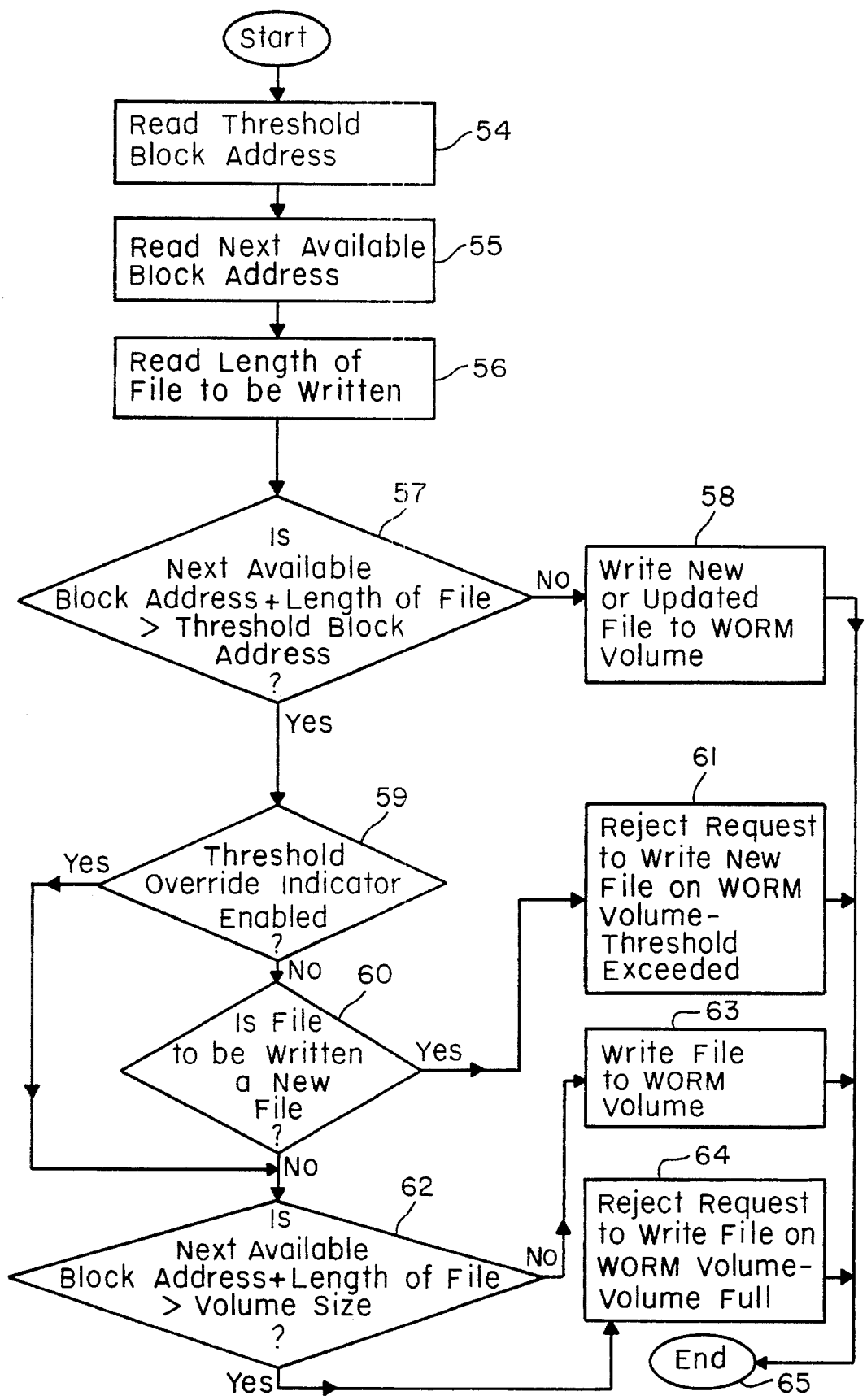
FIG. 5: OPEN VOLUME REQUEST

SYSTEM AND METHOD FOR WORM VOLUME MANAGEMENT OF NEW AND UPDATED DATA FILES USING VARIABLE THRESHOLD BLOCK ADDRESSES

FIELD OF THE INVENTION

This invention relates to the data processing field. More particularly, this invention allows variable thresholding to be used with WORM Media volumes.

BACKGROUND OF THE INVENTION

Large capacity Write Once Read Mostly (also known as Write Once Read Many, or WORM) optical storage has recently become available at a reasonable price. New applications have used WORM optical storage to efficiently and economically store vast amounts of data, such as image data, that would normally be archived in warehouses or basements on paper, x-rays, etc. A volume of data is normally stored on one side of a WORM optical disk. A mass optical storage device (also known as a "jukebox", or MOSD) is used to access several WORM optical disks located in an optical library. The MOSD has a mechanical arm or robot that selects one of the WORM optical disks out of the library and moves the disk into a read/write drive.

One optical library can store up to 20,000,000 documents or 2,500,000 images. 128,000 conventional magnetic diskettes would be required to store this massive amount of data. An optical library made up of low cost WORM optical disks could replace a whole warehouse full of paper or other hard copy data. Retrieving archived data located in an optical library is much easier, safer and quicker than looking through literally tons of paper to find the desired document.

For all its benefits, WORM optical storage does have some drawbacks. The biggest drawback is that WORM optical disks can only be written to once. There is no way to erase data that has already been written to a WORM volume. If a document or file stored on an WORM volume needs to be updated, the updated file needs to be stored in addition to the original file. If the volume is almost full and does not have sufficient space to store the updated file, the updated file must be stored on a different volume than the original file.

There are many applications where it is important to have the original file and updated file(s) stored on the same volume. One such application is where the names of image files are kept in one or more indexes in a data base. Storing updated versions of an image on another volume or volumes would require the burdensome task of changing the name of the image file on all volumes where the versions exist.

Another application where it is important to have the original file and updated file(s) stored on the same volume is where an audit trail of all changes to the file is desired. An audit trail requires that both the original file and the updated file be retrieved. Performance of a MOSD is dramatically improved if files that are often accessed together are stored together on a single volume, since retrieving multiple optical disks is slow, inefficient and time consuming.

SUMMARY OF THE INVENTION

It is a principle object of the invention to efficiently store data in a computer system.

It is another object of the invention to efficiently manage WORM volumes.

It is another object of the invention to keep original files and updated files on the same WORM volume whenever possible.

Another object of the invention is to reduce the number of optical disks required to be read to perform a requested task.

These and other objects are accomplished by the use of variable thresholding on WORM volumes disclosed herein.

A technique of efficiently managing Write Once Read Mostly (WORM) volumes on mass optical storage devices is disclosed. A configuration menu asks the user to enter a threshold percentage from 1–100%. The threshold percentage is multiplied by the volume size to determine a threshold block address. New files are written sequentially to the WORM volume up to but not exceeding the threshold block address, unless a threshold override indicator is enabled. Space on the WORM volume between the threshold block address and the end of the WORM volume is reserved for updated files. Updated files can be stored anywhere on the WORM volume, including above the threshold block address. Reserving space for updated files on a WORM volume allows more updated files to be stored on the same WORM volume as original files, and reduces the number of optical disks required to be read. The threshold percentage can be modified by the user at any time desired.

BRIEF DESCRIPTION OF THE DRAWING

FIGS. 4–5 show the flowcharts of the invention.

DESCRIPTION OF THE PREFERRED EMBODIMENT

Figure 1:
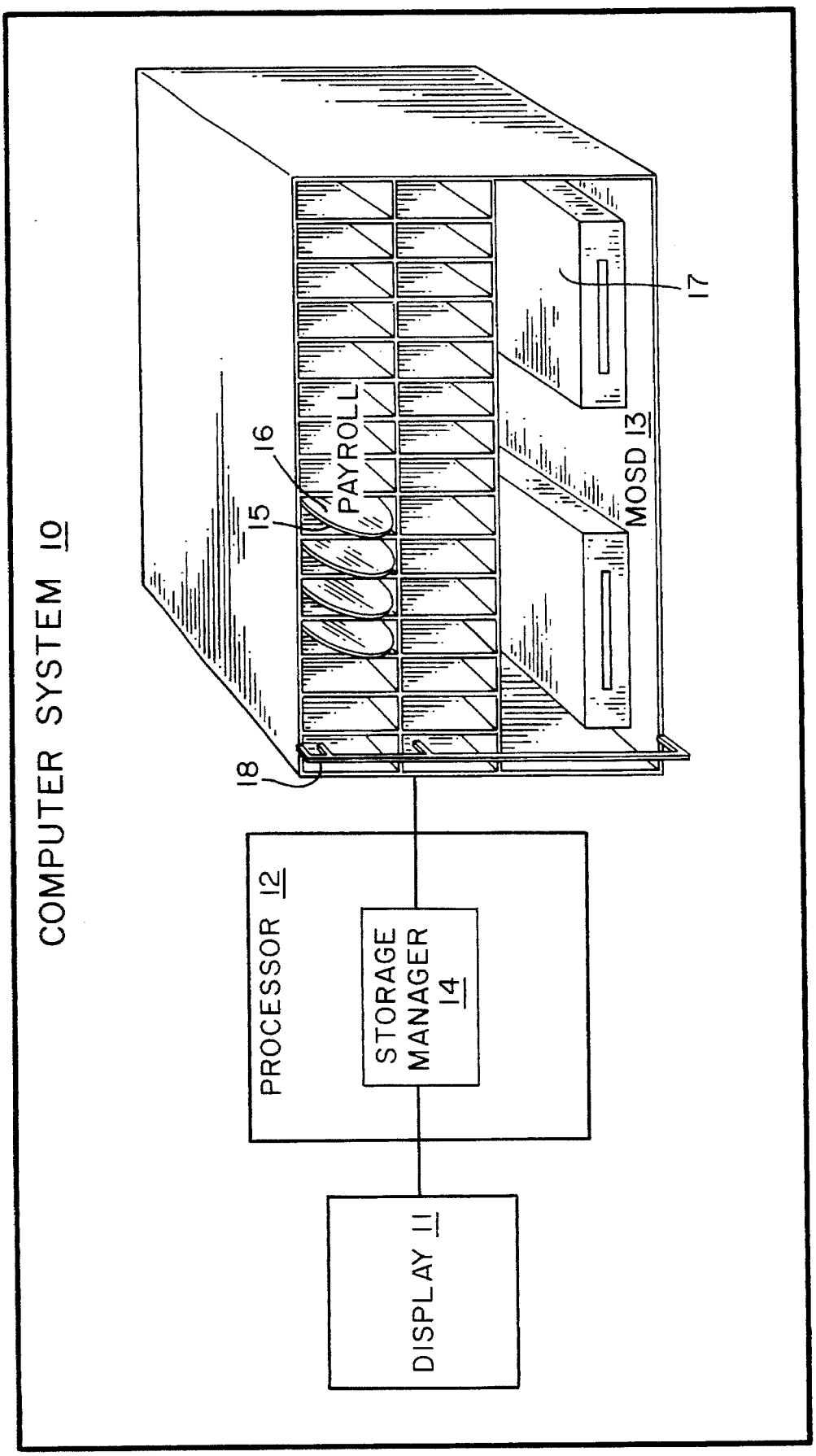
FIG. 1 shows a block diagram of the computer system of the invention.

FIG. 1 shows a block diagram of computer system 10 of the invention. Computer system 10 is made up of display 11, processor 12, and mass optical storage device (MOSD) 13. Processor 10 contains storage manager 14. MOSD 13 contains optical disk 15 and a plurality of other optical disks. MOSD 13 has a mechanical arm or robot 18 that selects one of the WORM optical disks out of the optical library and moves the disk into one of possibly several read/write drives 17.

Each optical disk is made of Write Once Read Mostly (WORM) media. WORM volume 16 is named "PAYROLL" and fills one side of optical disk 15. In the preferred embodiment, computer system 10 is an IBM 5363 with an attached display and an attached IBM 9246 Optical Library Unit.

Storage manager 14 is connected to display 11 and MOSD 13, and is responsible for managing MOSD 13 and communicating with the computer user via display 11. Note that although direct connection lines are shown between storage manager 14 and display 11 and MOSD 13, these connections can be made remotely over communications lines such as telephone lines, local area networks, etc. Note also that only processor 12 is shown, more than one processor and/or special purpose hardware may be used to perform the function of storage manager 14. In addition, the function of storage manager 14 may be physically located in MOSD 13.

Figure 2:
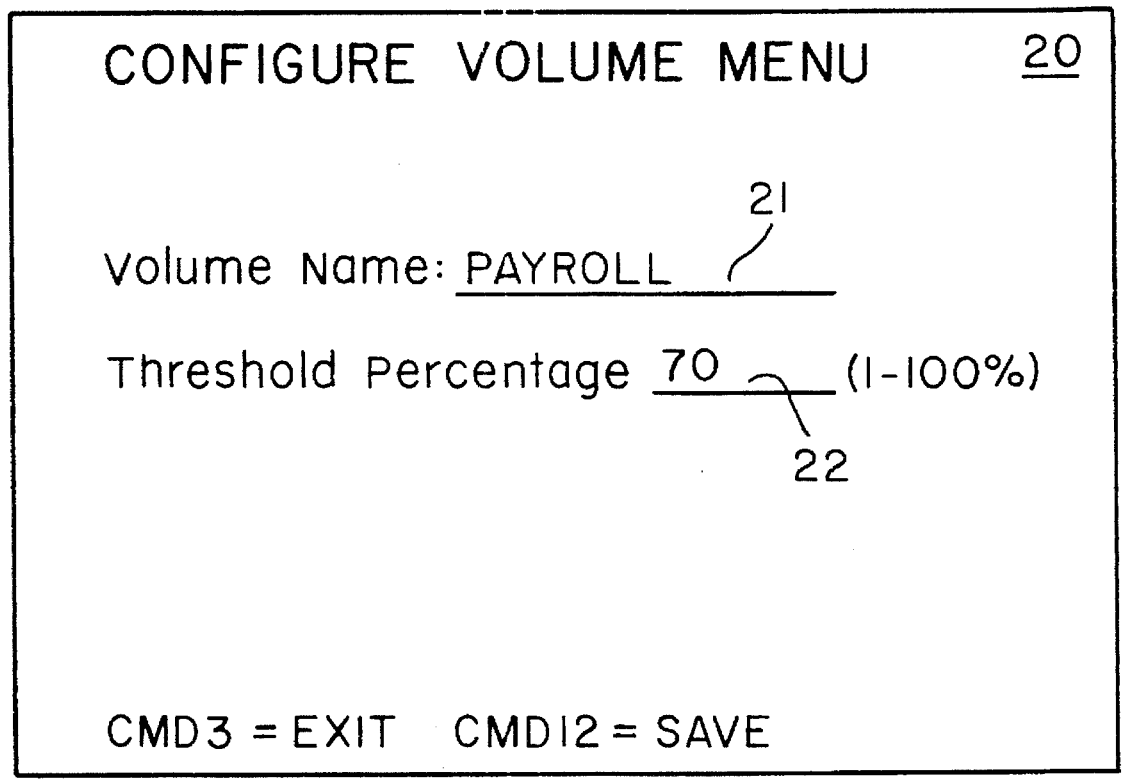
FIG. 2 shows the configuration menu of the invention as displayed to the user.

FIG. 2 shows the configuration menu of the invention as displayed to the user on display 11. The name of the de%red WORM volume is shown in field 21. The user is given the opportunity to enter a threshold percentage in field 22. Any percentage from 1–100% can be entered by the user. If the user does not choose to select a threshold percentage, a default value will be used. In the preferred embodiment, the default threshold percentage is 95%. In FIG. 2, the user has selected WORM volume 16 named "PAYROLL" to configure. The user selects a threshold percentage of 70% for WORM volume 16 and enters this percentage in field 22. This means that new files may be written only to the first 70% of WORM volume 16, but not the last 30%. The last 30% of WORM volume 16 is reserved for updates to files.

Figure 3:
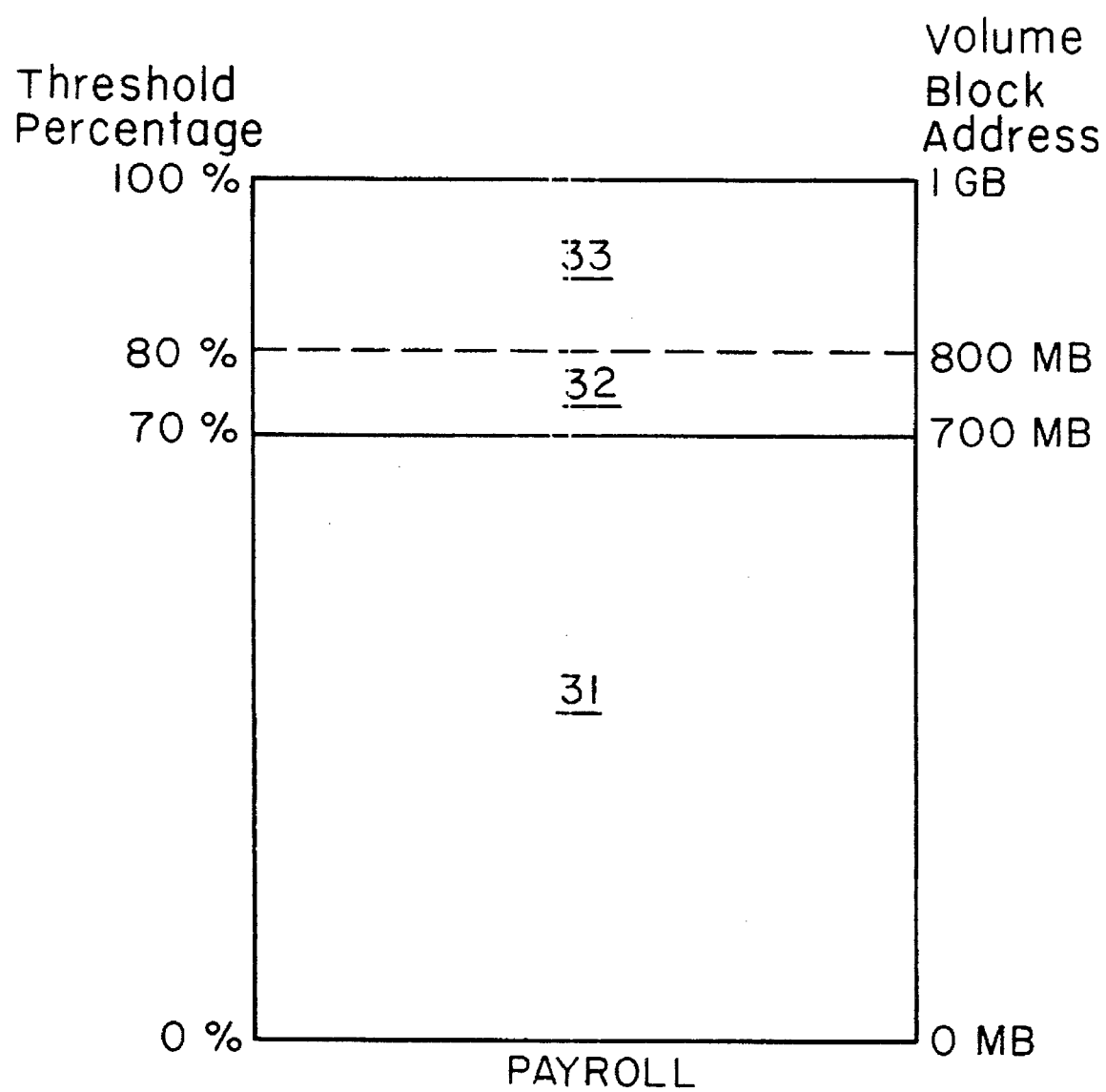
FIG. 3 shows a representation of the space allocation of a WORM volume of the invention.

FIG. 3 shows a representation of the space allocation of WORM volume 16 of the invention. Assume that WORM volume 16 is one Gigabyte in size, although a WORM volume of any size could be used. Since the user set a threshold percentage of 70%, new files may be written only to the first 700 Megabytes of WORM volume 16. The first 700 Megabytes (70%) of WORM volume 16 is shown as data segment 31. Both new and updated files can be stored on data segment 31.

The last 300 Megabytes (30%) of WORM volume 16 is reserved for updates to files. The last 300 Megabytes of WORM volume 16 is shown as data segments 32 and 33.

Note that the user can reconfigure WORM volume 16 at any time if desired. For example, if the user discovers that he does not need 30% of WORM volume 16 to be reserved for updates, he can select a new, larger threshold percentage, such as 80%. If this is done, data segment 32 is now available for new files.

There are also times that the user may wish to override the threshold for a single file. An override option is provided by the storage manager that permits a new document to be written into the reserved area.

FIGS. 4 & 5 show flowcharts of how storage manager 14 manages the WORM volumes on MOSD 13. Storage manager 14 executes the flowchart shown in FIG. 4 each time a configure request is made for a WORM volume. Configure requests are made whenever a new volume is initialized or the threshold is changed on an existing volume.

Block 41 asks if the user has specified a new threshold percentage for this WORM volume. If so, the new threshold percentage is read from field 22 of the configuration menu (FIG. 2) in block 42. Block 43 multiplies the specified threshold percentage by the volume size to arrive at a threshold block address. If the user does not specify a threshold percentage, block 42 uses the default threshold percentage. Block 44 saves the threshold block address, and the program ends in block 45.

Storage manager 14 executes the flowchart in FIG. 5 each time an open request for output is made for a file on a WORM volume. Open requests for output are made whenever data is to be written to the file on the WORM volume.

Block 54 reads the threshold block address as determined by blocks 41–45. Block 55 reads the address of the next available block address on the WORM volume. Files are placed on the WORM volume sequentially, so the next available block address is readily ascertainable. Block 56 determines the length of the file to be written on the WORM volume.

Block 57 takes the next available block address and adds it to the length of the file to see if this sum exceeds the threshold block address. If it does not, the file, whether a new file or an updated file, is written to the WORM volume in block 58 and the program ends in block 65. If the threshold is exceeded, block 59 checks to see if the threshold override indicator is enabled. If it is, flow of control skips block 60 and moves directly to block 62. If the threshold override indicator is not enabled (off), block 60 checks to see if this file is a new file or an updated file. It does this by looking for a file name on the WORM volume that matches the file name of the file to be written. If the file to be written is a new file, the request to write this new file is rejected in block 61, because no new files can be written in a data area greater than the threshold block address. Block 61 posts an error code which gives the user an error message such as "threshold exceeded", and the program ends in block 65.

If block 60 determines that the file to be written is an updated file, or if the threshold override indicator was enabled and block 60 was skipped, block 62 checks to see if the sum of the next available block address and the length of the file to be written exceeds the total space available on the WORM volume. If not, the file is written to the reserved space above the threshold block address of the WORM volume in block 63, and the program ends in block 65. If writing the file would exceed the total space available on the WORM volume, the request to write this file is rejected in block 64, because there simply is no room left on this WORM volume. Block 64 posts an error code which gives the user an error message such as "volume full", and the program ends in block 65.

While this invention has been described with respect to the preferred embodiment, it will be understood by those skilled in the art that various changes in detail may be made therein without departing from the spirit, scope and teaching of the invention. Accordingly, the herein disclosed invention is to be limited only as specified in the following claims.

What is claimed is:

1. A method of efficiently managing a write once read mostly (WORM) volume, comprising the steps of:

setting a threshold block address on said WORM volume;

determining the length of a data file to be placed on said WORM volume;

determining whether said data file is a new data file or an updated data file;

if said data file is a new data file, sequentially writing said new data file to said WORM volume only if said threshold block address is not exceeded by writing said new data file to said WORM volume; and if said data file is an updated data file, sequentially writing said updated file to said WORM volume regardless of whether said threshold block address is exceeded unless the size of said WORM volume is exceeded.

2. The method of claim 1, wherein said setting step comprises the steps of:

selecting a threshold percentage of said WORM volume; and multiplying said threshold percentage by the size of said WORM volume to obtain said threshold block address.

3. The method of claim 2 further comprising the step of:

sequentially writing said new data file to said WORM volume if said threshold block address is exceeded and if a threshold override indicator is enabled unless the size of said WORM volume is exceeded.

4. The method of claim further comprising the step of:

returning an error message to a user if writing said new data file would cause said threshold block address to be exceeded.

5. The method of claim 3, further comprising the steps of:

selecting a new threshold percentage of said WORM volume;

multiplying said new threshold percentage by the size of said WORM volume to obtain a new threshold block address; and sequentially writing said new file to said WORM volume only if said new threshold block address is not exceeded by writing said new file to said WORM volume.

6. A computer system having the capability to efficiently store data, comprising:

a display;

a mass storage device having a WORM volume;

storage manager means, connected to said display and to said mass storage device, for efficiently managing said mass storage device, said storage manager means further comprising:

setting means for setting a threshold block address on said WORM volume;

first determining means for determining the length of a data file to be placed on said WORM volume;

second determining means for determining whether said file is a new data file or an updated data file;

first writing means for sequentially writing said new data file to said WORM volume only if said threshold block address is not exceeded by writing said new data file to said WORM volume; and second writing means for sequentially writing said updated data file to said WORM volume regardless of whether said threshold block address is exceeded unless the size of said WORM volume is exceeded.

7. The computer system of claim 6, wherein said mass storage device comprises a plurality of optical disks.

8. The computer system of claim 6, wherein said setting means comprises:

selecting means for selecting a threshold percentage of said worm volume; and multiplying means for multiplying said threshold percentage by the size of said WORM volume to obtain said threshold block address.

9. The computer system of claim 8, further comprising:

third writing means for sequentially writing said new data file to said WORM volume if said threshold block address is exceeded and if a threshold override indicator is enabled unless the size of said WORM volume is exceeded.

10. The computer system of claim 8, wherein said threshold percentage is input from a configuration menu displayed on said display.

11. The computer system of claim 8, wherein said threshold percentage is a default value supplied by said computer system.

\* \* \* \* \*